United States Patent
Armstrong et al.

(10) Patent No.: US 12,141,905 B2
(45) Date of Patent: Nov. 12, 2024

(54) CONTENT GENERATION SYSTEM AND METHOD

(71) Applicant: Sony Interactive Entertainment Inc., Tokyo (JP)

(72) Inventors: Calum Armstrong, London (GB); Nicholas Anthony Edward Ryan, London (GB); Marina Villanueva-Barreiro, Acoruña (ES); Mark Anthony, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 143 days.

(21) Appl. No.: 17/962,568

(22) Filed: Oct. 10, 2022

(65) Prior Publication Data

US 2023/0117530 A1     Apr. 20, 2023

(30) Foreign Application Priority Data

Oct. 14, 2021   (GB) ...................................... 2114675

(51) Int. Cl.
*G06T 13/40* (2011.01)
*A63F 13/55* (2014.01)
*G06T 17/10* (2006.01)

(52) U.S. Cl.
CPC .............. *G06T 13/40* (2013.01); *A63F 13/55* (2014.09); *G06T 17/10* (2013.01); *A63F 2300/6607* (2013.01)

(58) Field of Classification Search
None
See application file for complete search history.

(56) References Cited

U.S. PATENT DOCUMENTS

| | | |
|---|---|---|
| 8,228,336 B1 | 7/2012 | Dykes |
| 9,741,146 B1 | 8/2017 | Nishimura |
| 10,930,066 B1 | 2/2021 | Thacker |
| 10,970,907 B1 | 4/2021 | Albuz |
| 11,077,367 B1 | 8/2021 | Thacker |
| 11,173,397 B2 | 11/2021 | Mahlmeister |
| 11,185,786 B2 | 11/2021 | Mahlmeister |
| 11,288,508 B2 | 3/2022 | Vo |
| 11,455,527 B2 | 9/2022 | Thomas |
| 2009/0315839 A1 | 12/2009 | Wilson |
| 2020/0222804 A1* | 7/2020 | Cappello ................. A63F 13/52 |
| 2020/0269136 A1 | 8/2020 | Gurumurthy |
| 2021/0104087 A1 | 4/2021 | Smith |

(Continued)

OTHER PUBLICATIONS

Combined Search and Examination Report for corresponding GB Application No. 2114675.8, 7 pages, dated Apr. 21, 2022.

(Continued)

*Primary Examiner* — Nurun Flora
(74) *Attorney, Agent, or Firm* — Matthew B. Dernier, Esq.

(57) ABSTRACT

A content generation system operable to generate one or more actions to be performed by an agent, the system comprising an input receiving unit operable to receive two or more actions for the agent, a model generation unit operable to input the actions to a machine learning model so as to generate a trained machine learning model, and an action generation unit operable to generate an action to be performed by the agent, wherein the generation comprises the selection of a latent space interpolation state associated with the trained machine learning model.

13 Claims, 4 Drawing Sheets

(56) References Cited

U.S. PATENT DOCUMENTS

2021/0158589 A1 5/2021 Rico
2021/0308580 A1 10/2021 Akhoundi
2022/0274018 A1 9/2022 Gurumurthy
2022/0319088 A1 10/2022 Wedig
2023/0398456 A1 12/2023 Akhoundi

OTHER PUBLICATIONS

Communication Pursuant to Article 94.3 for related EP Application No. 22196910.8, 5 pages, dated May 8, 2024.
Combined Search and Examination Report for related GB Application No. 2114678.2, 7 pages, dated Apr. 13, 2022.
Communication Pursuant to Article 94.3 for related EP Application No. 22196910.8, 5 pages, dated Dec. 19, 2023.
Extended European Search Report for related EP Application No. 22196910.8, 10 pages, dated Feb. 23, 2023.
Omid Alemi et al:"Machine Learning for Data-Driven Movement Generation: a Review of the State of the Art", arxiv.org, Cornell University Library, 56 pages, dated Mar. 20, 2019. (for relevancy see Non-Pat. Lit. #1).
Extended European Search Report for related EP Application No. 22196898.5, 8 pages, dated Mar. 2, 2023.
Examination Report for corresponding GB Application No. 22114675.8, 4 pages, dated May 15, 2024.
Examination Report for related GB Application No. 22114675.8, 4 pages, dated May 15, 2024.

* cited by examiner

CONTENT GENERATION SYSTEM AND METHOD

BACKGROUND OF THE INVENTION

Field of the Invention

This disclosure relates to a content generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years there has been a significant increase in the number of people playing computer games; it has been estimated that the number of gamers worldwide numbers in the billions when accounting for all platforms. This has been driven in part by the increase in both the computing power that is available to consumer devices, and the cost of obtaining those devices. Alongside this increase in gaming interest, there has also been a significant increase in the demand for video game spectating; this includes both at a professional esports level, and a more casual streaming level.

Such large numbers of gamers and spectators leads to a demand for increasingly flexible and customisable gaming experiences; players often wish to have a unique experience that is tailored to their own preferences, whilst spectators will be interested in a more varied viewing experience. This is often addressed in games through the use of customisable elements (such as outfits or characters), but this may not fully address this problem.

However, it is not practical for a games developer to provide enough meaningful variety in games to satisfy all of the consumers (that is, players and spectators). While in practice it is simple to introduce a wide amount of variation into a gaming environment (for instance, by enabling twenty colour options for ten different items of clothing this provides over a trillion possible combinations), this variation will not have a significant impact on the consumers experience—while each character may appear different, the characters may still be similar enough so as to have a similar visual impact.

One solution that may be considered to introduce variety into a game environment is that of procedural generation; this may be particularly applicable in the generation of virtual environments. This can be advantageous in that a new environment can be generated based upon a number of predefined rules or relationships between different elements—and thereby the number of possible environments can be increased without adding a significant overhead in terms of data distribution or developer time. However, whilst a vast number procedurally generated virtual environments are possible, their generation is frequently too heavily constrained, resulting in a lack of variety, or too loosely constrained, resulting in jarring or discontinuous virtual environments as well as potentially not being suitable for the content that the virtual environment is generated for.

One particular problem associated with procedural generation is the condition that may be known as 'procedural oatmeal', in which a large number of maps (or other content) can be generated which are all different but lack distinctiveness. The name of this is derived from an analogy in which procedural generation is used to generate bowls of oatmeal—while each may have a different arrangement of oats, the person eating the oatmeal will not be able to tell the difference. In the context of a virtual environment, this could lead to an example in which a user can be provided with a large number of different environments that each produce the same overall impression during gameplay.

It is therefore apparent that in many cases, such an approach does not provide variety in a gaming experience in a desirable and satisfactory manner.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, embodiments of the present disclosure are described.

One area in which variations in content can be introduced is in that of different animations being used to represent a common action. For example, several animations can be provided that each represent a 'jump' action. By providing several animations, the range of customisation available to a user for generating an avatar can be increased and/or the actions associated with a particular avatar can be made more varied. This results in an improved user experience.

Embodiments of the present disclosure provide a way to streamline the creation process for such animations by utilising a machine learning model. This makes the generation process more efficient (reducing a burden upon content developers), enabling the improved user experience to be provided without investing overly-significant amounts of developer time. Such implementations can also provide a more efficient data transmission and storage; by providing a trained machine learning model that can generate animations the need for transmitting a large amount of information regarding each of the possible variations is reduced.

Further to this, embodiments of the present disclosure can lead to an improved sense of immersion for a user when used with virtual content such as a game; the use of repetitive motions that are identical (or a small number of actions variations) can appear unrealistic. In a use case in which real-world objects are controlled, an improved navigation of an environment may be provided.

It is considered that embodiments of the present disclosure may be characterised as utilising one of two approaches; an interpolative approach, and generative approach. The first of these uses information about classified actions to enable the generation of new actions that comprise characteristics of those classified actions as desired. The latter approach instead utilises a single input action and one or more associated constraints on the action to generate variations on that action. In each case, it is considered that the output comprises new actions (or at least visual variants of actions) that can be used to increase the variety of actions in a given context.

In either case, it is considered that the user of the actions (such as the player of a game) may be able to toggle the use of the action generation. For instance, rather than generating a new action it may be considered that existing actions which have already been defined may be used even if this would lead to reduced immersion; this may be preferred in the case in which more uniform actions may be preferred, as this may enable a user to more accurately follow events within the game.

The interpolative approach utilises the selection of a latent space state from a latent space defined by the inputs to the machine learning model. This selection comprises the determining of an intervening location in the space that lies between desired characteristics.

For instance, in embodiments of the present disclosure a latent space may be defined by a machine learning model which is trained to characterise different types of motion. Each of the different types of motion occupies a different area of the latent space, in dependence upon the characterisation. For instance walking and running may occupy similar (but still distinct) areas due to their similarity as actions, while jumping occupies a third area that is further from walking and running than they are from each other due to the greater differences. By determining the vectors used to describe each of these areas, intervening vectors may also be determined that occupy the same space and have varying characteristics of each of the nearby actions.

An exemplary approach that may be used to implement embodiments of the present disclosure is the use of a convolutional neural network. Such networks are often used for feature learning and classification, and may be suitable in a number of embodiments of the present disclosure. Of course, alternative approaches may also be of use; any network that utilises a latent space representation of content may be appropriate, such as auto-encoding networks.

Figure 1:
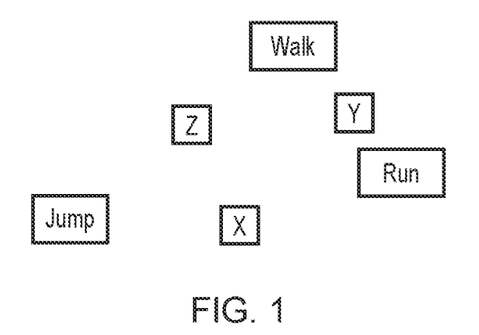
FIG. 1 schematically illustrates a simplified example of a latent space.

FIG. 1 schematically illustrates a simplified example of such a latent space. This example shows a two-dimensional distribution of actions, although in practice the number of dimensions would be expected to be greater than this as such a low dimensionality in practice may lead to less useful results. While the below discussion refers to relative locations of actions within the space, it should be appreciated that vector distances in higher-order dimensions may lead to a more complex process than that which is considered in the examples below. As such, references to proximity below should be interpreted in a broad sense rather than a literal distance between areas in a latent space.

The actions 'walk' and 'run' are located with reasonable proximity to one another, given the similarities in the appearance of the actions (that is, they are similar actions in that both relate to movement without an altitude component). The action 'jump' is located in the same space, but further away as this has fewer similarities than running and walking—for instance, due to the fact that there is a significant vertical component to the motion which is absent from running and walking.

It may therefore be considered that the intermediate location in the space denoted by the letter X corresponds to an action that has similarities to both running and jumping, as it occupies a space between these two actions. While the actual form of the action varies in dependence upon the machine learning model that is associated with the latent space (for instance, which characteristics the model uses to classify actions), it may still be expected that the action would be able to be recognised as being an interpolation of the two actions. The action corresponding to location X may therefore be anticipated to be a running jump, for example.

Similarly, it may be considered that the intermediate location in the space denoted by the letter Y corresponds to an action that has similarities to both running and walking. Such an action may be a fast walk, a walk with a longer stride, or a jog, for example. As noted above, the exact form of the action is determined in dependence upon which characteristics are identified as being representative of each action—and as such the interpolated action may vary in dependence upon the trained model that is used to generate the latent space even for the same position relative to the same actions.

Finally, it may be considered that the intermediate location in the space denoted by the letter Z corresponds to an action that has similarities to each of the three actions in varying proportions. With a distance being relatively large between Z and 'jump', it may be expected that only a small jump or hop may be present in the action and that the action largely resembles a walk due to the much greater proximity.

In some embodiments, multiple instances of the same action may be provided as examples; in such a case rather than a single instance of each action being present in the latent space as shown in FIG. 1, it is expected that numerous examples of each are present. This may be advantageous for increasing the quality of the training, and subsequently the outputs generated. In these embodiments, a clustering may be identified so as to determine the location of different actions—those clusters may each correspond to a different action or other classification. In some cases the average location of the clustered elements may be considered to be the location of the action in the latent space—of course, other methods of determining a representative location (such as a weighted average, or a median coordinate) may also be considered appropriate.

While the above example refers to single actions being distributed throughout a latent space, it is considered that more complex actions (such as a run followed by a jump) may also (or instead) be characterised by a machine learning model and assigned a location in the latent space. While this can increase the complexity of the model and the action generation process, this may increase the fluidity of the output actions in that actions would be generated in groups rather than as individual actions.

Rather than classifying different types of actions, it is also considered that a classification may be performed in dependence upon other characteristics. For instance, the classification may be of variations of a single action in dependence upon characteristics such as mood, intensity, speed, or the like. That is to say that the classification may be performed in dependence upon one or more physical or other characteristics of an action rather than in dependence upon the type of action.

In some embodiments, this may be implemented such that a first action is a 'fast walk' and a second action is a 'slow walk'. Other examples include a 'happy walk', a 'sad walk', and an 'excited walk'; 'energetic walk', 'drunken walk', and 'fatigued walk'; and 'eager walk' and 'reluctant walk'. Any suitable characteristics and actions may be considered, and in any combination—the classification need not be limited to a single classifier. For instance, 'happy energetic walk' and 'happy fatigued walk' may be examples of classification based upon multiple classifiers.

While discussed in the context of a single action and a single range of classifiers, it is considered that in some embodiments it may be advantageous to generate a latent on the basis of a more diverse range of characteristics. In other words, it is considered that multiple actions and variations of those actions may be provided to a machine learning model for training purposes so as to result in a latent space that comprises a range of different actions and variations on those actions.

Figure 2:
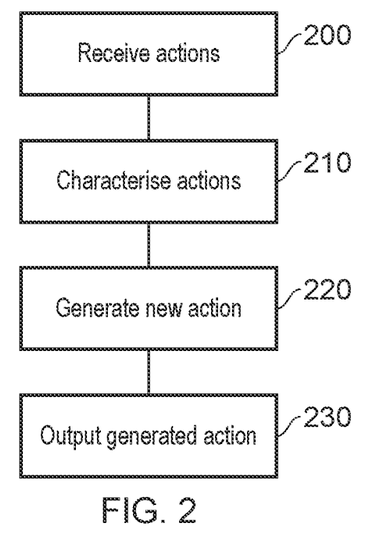
FIG. 2 schematically illustrates an interpolative method for generating actions.

FIG. 2 schematically illustrates an interpolative method for generating actions in line with the above discussion.

A step 200 comprises receiving one or more actions as inputs. These actions may be performed (or be intended to be performed) by any suitable acting element; examples include video game characters, computer generated models, robots, or any other element. While humanoid elements have generally been discussed throughout this document, for instance through reference to walking and running, it is considered that the teaching of the present disclosure may be applied equally to other types of elements (such as quadrupedal, or those with no legs) as desired.

These actions may be received in any suitable format, with an appropriate conversion being applied as desired to generate a preferred input for a machine learning model where necessary. For instance, the received actions may be in the form of a video clip or animation which is able to be analysed using image processing techniques. Alternatively, or in addition, the received actions may be in a parameterised format describing the motion (such as a format in which movement of each limb is expressed numerically with respect to a centre of mass of the acting element), a wireframe representation of a motion, or any other format.

A step 210 comprises characterising the received inputs using a machine learning model. This process may comprise the characterisation of additional actions other than those that are received as inputs, for instance one or more 'reference actions' that represent a predetermined action that can be used as an input to the model. For instance, a developer could generate a walking action for a character as an input and then use a predetermined running action as a second input. This characterisation by the machine learning model is performed so as to result in the generation of a latent space representing the characterised actions.

In some embodiments, the characterisation may be performed by a pre-trained model which is configured to identify particular characteristics of the received inputs; for instance, a model that is trained to characterise actions of a particular element (such as a human-specific model) or to identify particular characteristics (such as energy levels) for actions.

Similarly, in some cases a partially-trained model (or a model that has otherwise already been trained on a number of inputs) may be used to characterise the received inputs. This can effectively result in an updated model, rather than an entirely new model, which may reduce the training time upon reception of the new actions significantly.

A step 220 comprises the generation of a new action by selecting an appropriate location within the latent space and using this as the basis for a new action. This selection can be based upon any suitable factors; in some cases it may simply be a random selection. In some embodiments, the selection may be based upon an input to the process that requests a particular action. For instance, in a model that is trained so as to characterise a walking action and a running action a request for a jogging action may lead to the selection of a point in the latent space that is approximately halfway between walking and running actions. It is considered that the selection in response to a request may still contain some element of randomness, so as to enable a range of different actions to be generated based upon the same outputs.

In some cases, the generation is generated based upon a game state or the definition of one or more criteria relating to a desired action. For example, a user's inputs with a controller may be used to select a location in the latent space—particular combinations of button presses may correspond to particular combinations of actions, which can be used to select an appropriate position in latent space to represent an action for that combination. Other considerations may include the state of an avatar (such as energy levels, injury, or excitement) or agent (such as remaining battery power or allowed noise levels).

Similarly, the (real or virtual) environmental conditions may be used to determine a location in the latent space. For example, when faced with a particular obstacle it is possible to determine the properties of a required action to overcome that obstacle and to map this to an area in latent space. For instance, if the environment contains a pit that is to be jumped then it is possible to determine a range of trajectories that would enable this to be performed. This can then be used to identify a height and a distance component of the jump, which can then be used to specify a latent space location at an appropriate distance between a run and a static jump that would correspond to those components.

User preferences may also be considered when identifying an appropriate position in latent space. For instance, a user may indicate a preference for a particular style or type of action; one example of this is that of a user indicating that they prefer faster motions, which can lead to a latent space location being selected that is nearer to fast actions (such as running) than it would be for the average user. Alternatively, or in addition, preferences may be included during a character creation process in a game. These may enable a user to indicate preferred motions, which can influence the selected latent space position.

Such preferences may be input directly by a user, or may be derived from a calibration process or the like. For instance, a user may be shown a number of different motions and asked to provide a ranking so as to determine which style of action is preferred for a number of different circumstances. Alternatively, or in addition, a user may also be able to modify or generate the inputs to be received at step 200 so as to reflect their personal preferences. For instance, the user who prefers faster motion may be able to edit an input walking action so as to be faster, which can reduce the distance between running and walking in latent space—and as such cause the average of these actions to be faster than in the unedited case.

The above discussion regarding the selection of an appropriate location in latent space are to be considered exemplary only; it is considered that the skilled person is able to identify an appropriate selection process for a given application so as to generate an appropriate action to be output for use.

A step 230 comprises the output of the generated action. As discussed above with reference to the reception of input actions, this output may be in any suitable format and may comprise a conversion of the format if desired. This output may be stored for future use (for example, when the output may be generated during a character creation process in a game and then stored until a particular action is performed) or may be utilised substantially immediately for updating a game or simulation, or for controlling a real-world agent such as a robot. In the latter case, this can be considered to be an on-the-fly action generation, which can be advantageous due to the increased flexibility of actions without a substantial increase in latency associated with this process Such a method may be performed at any suitable time prior to the use of the generated action; in some embodiments it is considered that it may be appropriate to perform to the method in a staggered manner such that the characterisation step 210 is performed without performing the generation step 220 immediately. This can enable the distribution of a trained model, for example, so as to preclude the need for distributing information defining a number of specific actions.

While in many cases it may be considered that the output of the trained model will be in a format that can be immediately used (or can be used with a conversion process), in some cases further processing may be desired. This processing may comprise any suitable modification to the output, such as modifying one or more aspects of an action including a speed and/or form (such as changing a position of one or more limbs in the action). For instance, a smoothing process may need to be applied for the action to ensure that it is realistic (for instance, to remove any discontinuities or jumps) or to ensure that a transition between actions is realistic. Alternatively, or in addition, modifications may be determined in dependence upon physical considerations such as weight or momentum. This processing can result in a more realistic or otherwise improved motion.

These modifications may be implemented by an intermediate process, such as a games engine or a physics simulation engine, between the trained model and the implementation of the action (such as the rendering or execution of an action). Alternatively, or in addition, one or more of the modifications may be incorporated into one or more of the other processes (such as the action generation and/or action execution processes).

As noted above, in some embodiments it may be desirable to impose one or more constraints upon the generated action so as to ensure that the action is suitable to satisfy the needs of an agent that is performing the action. In some embodiments, this may be a constraint such as a 'minimum jump length' or 'target movement speed'. There are numerous ways to generate an action that satisfies these constraints using embodiments of the present disclosure, a selection of which are described below. These constraints may be based upon information about a real or virtual environment that is to be navigated, for example, or so as to more closely resemble existing actions. This may be particularly useful when seeking to generate numerous actions that differ in appearance rather than effectiveness, which can be important for consistency and/or balance within a game for example.

One example of implementing these constraints is to use them to identify an area of latent space that is likely to have the desired features. For instance, a desired movement speed may be achieved by selecting a position (or identifying a region) in latent space which is at a corresponding position between a fast and a slow action.

A second example, which may be used as an alternative or additional process, comprises the generation of a plurality of candidate actions and the selection of a preferred one of those actions in dependence upon the constraints. For example, a desired movement speed may be achieved by generating a plurality of actions having different movement speeds and then selecting the action (or one of the actions) which has the desired movement speed or has a speed most closely aligned with the desired movement speed.

Alternatively, or in addition, a selected action may be modified after selection so as to satisfy one or more constraints. This may be through any appropriate scaling of actions or the like. For example, a selected action may be subjected to a modification in the form of a multiplier to the action execution speed or duration; this can result in a 'fast-forward' effect in which an action is reproduced at a speed that is faster or slower than the initial selected action. With some actions, it may be desirable that the scaling factor is small so as to ensure a natural-appearing display of the action—for instance, a walk action that is reproduced at five times the speed will not appear as natural as a running action which has five times the speed.

When implementing the machine learning model for the purpose of characterising input actions, the characteristics to consider may be selected freely so as to generate a desired latent space. A desired latent space may be selected as one which enables the generation of actions with desired characteristics.

In some embodiments, those characteristics may be physical—the latent space may be used as the basis for generating actions with a particular speed or height change, or more generally for generating actions that lie between predetermined actions (such as walking and running).

Alternatively, or in addition, those characteristics may be indicative of non-physical parameters such as mood or how energetic an agent is feeling. In such cases it may be advantageous to input a number of examples of the same action being performed in different ways so as to enable the non-physical parameters to be identified more easily.

While in some embodiments a machine learning model is provided with examples of actions and then performs a characterisation process without other input, in some embodiments it may be considered advantageous to use a pre-trained model as the basis for such a characterisation. For instance, an action-classifying model or program (used to classify actions based upon any desired criteria) may be used to derive one or more parameters from the input actions which are then used to characterise the actions.

For example, a pre-trained model or program may be able to identify a movement speed or points of ground contact within an input action which can be used as the basis for a characterisation process in accordance with embodiments of the present disclosure.

In some embodiments, it is considered that the input actions that are used to generate a latent space may be provided by a user themselves, rather than being specified by a game developer or the like. For instance, a user may record a video of themselves performing one or more actions or may use a tool that enables them to create actions by manipulating a virtual avatar or the like. In some embodiments, it is also considered that a user may be able to obtain examples of one or more actions from a data store (such as via an online shop)—this may be populated with any type of predefined actions, including those which relate to celebrities or the like so as to be able to generate actions that mimic particular people. This may be considered to be a 'style transfer' in that the style of a third party is applied to another character. This transfer may be complete, in that the style is reproduced very clearly, or only partial in that the transferred style can be identified (for instance through characteristic motions, such as a distinctive flourish) without the style being fully reproduced. One example of this may be in a sports game, in which a player's running, shooting, and celebration actions are used as input actions—the generated actions from this may be very close representations of the player's actual actions, or they may simply influence the actions so that the generated actions are only considered 'player-like' (in the sense that they remind an audience of that particular player).

In one exemplary embodiment, the generation of a jump action for a particular character is considered. The jump is intended to have both a distance and a height component (that is, it is a forward jump rather than jumping on the spot). This generation may therefore be based upon a known walk, run, and jump action; this known jump may be static (on the spot), or may include a distance component.

Using these actions as inputs to a model, a latent space is generated which comprises interpolations between these actions. Based upon a selection criteria, a suitable location within the latent space is identified and the corresponding action used as the jump. The selection criteria may be based upon the distance required (or desired) for the generated jump—a longer jump would suggest the use of a latent space location between jumping and running, but further from walking, for example.

While discussed above in the context of interactive content such as computer games, it is also considered that the teachings of the present disclosure can be used in other contexts. For example, rather than requiring an interactive component the methods may be implemented for animation purposes such as to generate movie content.

A further example is that of real world actions; the techniques presented in this disclosure may be equally applicable to the control of a robot or the like. This may enable an improved automated control of a robot, either through full automation (a robot that can navigate an environment and perform tasks independently) or through enabling a goal-based control (such as 'jump over this object', with the robot determining an appropriate jump action). In such cases, the actions used to generate the latent space are able to be defined as a base set of actions that can be successfully performed by the robot with more complex and varied actions being defined by intermediate latent space locations.

Figure 3:
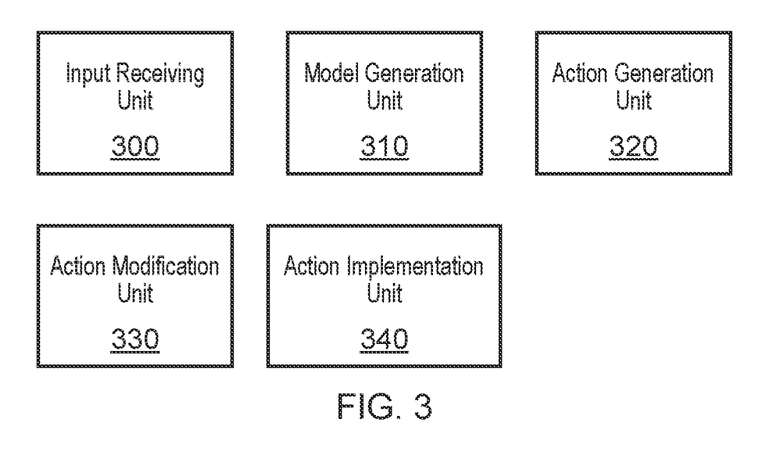
FIG. 3 schematically illustrates a content generation system.

FIG. 3 schematically illustrates a content generation system operable to generate one or more actions to be performed by an agent. The system comprises an input receiving unit 300, a model generation unit 310, an action generation unit 320, an optional action modification unit 330, and an optional action implementation unit 340. While shown as a single unit, the processing may be distributed amongst any number of different devices and processors; for instance, training may be performed at a first device (such as a computer associated with a creator of content) with the action generation being performed at a second device (such as a games console associated with a player).

The input receiving unit 300 is operable to receive two or more actions for the agent; these may be provided in any suitable format for a given implementation, including one or more of animated models, wire frames, descriptions of motion, parameters, and/or video clips identifying actions. In many cases, the two or more actions comprise actions that represent distinct actions. For example, a run action and a jump action may be provided as inputs to generate a latent space that comprises interpolations of these two actions.

In some embodiments, the two or more actions comprise actions that represent variations on a single action. For example, two different jumps or runs may be provided that represent variations on a single action. This may be advantageous in that the interpolated actions may be improved as a result due to the increased amount of input data.

The model generation unit 310 is operable to input the actions to a machine learning model so as to generate a trained machine learning model. In some embodiments the machine learning model is a convolutional neural network, although any suitable model may be used as appropriate for a given implementation.

The action generation unit 320 is operable to generate an action to be performed by the agent, wherein the generation comprises the selection of a latent space interpolation state associated with the trained machine learning model. In some embodiments the action to be generated is determined in accordance with one or more criteria; for example, an action may be selected that is expected to lead to a desired result—for instance, the desired action may be defined as 'a jump to overcome a one metre gap'. Examples of suitable criteria include one or more of a duration, speed, or effect of the action.

Alternatively, or in addition, the selection of a latent space interpolation state can be performed in dependence upon one or more constraints upon a desired action to be generated. For instance, an appropriate location (or approximate location, such as a particular region) of latent space may be determined based upon the desired action to be generated. For example, input and desired actions may have an associated speed parameter; an appropriate location in latent space may be determined by identifying a region which is an appropriate distance between the input locations in dependence upon the speeds. For instance, if a first input action has a speed of 'one unit' and a second input action has a speed of 'five units', then a desired action having a speed of 'two units' may be expected to correspond to a location in latent space that is approximately one quarter of the distance between the first and second input actions (being closer to the first).

The action modification unit 330 is operable to apply one or more modifications to the information defining the action to be performed. For example, this may comprise changing the speed at which an action is performed, or modifying the action to appear more realistic or more in keeping with an environment or character. Similarly, a consideration of physical constraints upon a motion may be considered— enabling a change to the action to make the action appear more realistic, for instance. Modifications may also be implemented to improve the transitions between actions during reproduction of those actions.

The action implementation unit 340 may be operable to animate a virtual element corresponding to the agent in accordance with the generated action; alternatively, or in addition, the action implementation unit 340 may be operable to control a physical element corresponding to the agent in accordance with the generated action. In the former case, this may include use in a gaming application or an animation context (such as generating content for a movie); in the latter, this may relate to the control of a robot or other physical device. In the case that an action modification is performed by the action modification unit 330, it is considered that the modified actions may be used in place of the generated actions.

The arrangement of FIG. 3 is an example of a processor (for example, a GPU and/or CPU located in a games console or any other computing device) that is operable to generate one or more actions to be performed by an agent, and in particular is operable to:

receive two or more actions for the agent;

input the actions to a machine learning model so as to generate a trained machine learning model;

and generate an action to be performed by the agent, wherein the generation comprises the selection of a latent space interpolation state associated with the trained machine learning model.

Optionally, the processor may also be operable to apply one or more modifications to the information defining the action to be performed, and/or to control a virtual or physical element in dependence upon the generated actions.

Figure 4:
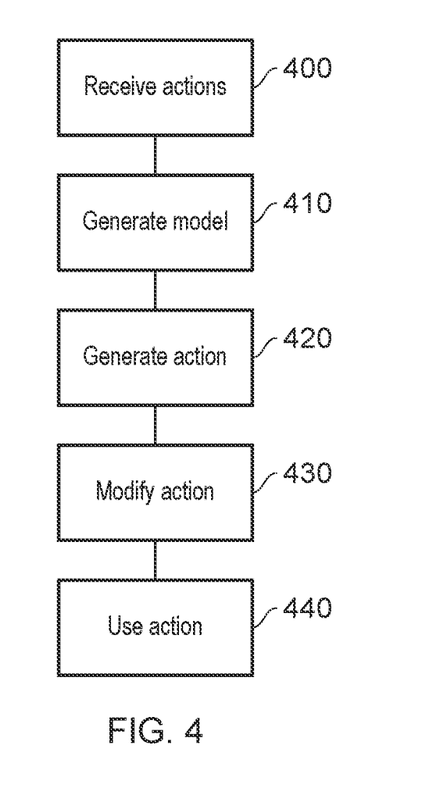
FIG. 4 schematically illustrates a method for generating one or more actions to be performed by an agent.

FIG. 4 schematically illustrates a method for generating one or more actions to be performed by an agent in accordance with one or more embodiments of the present disclosure.

A step 400 comprises receiving two or more actions for the agent.

A step 410 comprises inputting the actions to a machine learning model so as to generate a trained machine learning model.

A step 420 comprises generating an action to be performed by the agent, wherein the generation comprises the selection of a latent space interpolation state associated with the trained machine learning model.

Optionally, a step 430 comprises applying one or more modifications to the information defining the action to be performed.

A further optional step 440 comprises using the action, for instance by animating a virtual element corresponding to the agent in accordance with the generated action; alternatively, or in addition, the action implementation unit 340 may be operable to control a physical element corresponding to the agent in accordance with the generated action.

While the above discussion relates to an interpolative generation of actions, it is also considered that a generative approach may be suitable in many cases. This may be advantageous in arrangements in which a greater number of constraints are to be applied to a generated action, for instance. The increased number of constraints can serve as a set of criteria and/or inputs to enable a desired action to be generated reliably.

The generative approach may also be appropriate in cases in which variations on a defined action are desired, rather than the generation of a new action; variations may be desired to increase the unpredictability and novelty of content, with the generative approach representing an efficient method of providing this (for instance, relative to defining multiple actions manually and including each in content for distribution). In such embodiments, it is considered that by applying an input action and appropriate constraints it is possible to generate new actions that are stylistically as well as functionally consistent.

Examples of constraints may include any characteristic of an action or parameter associated with an action. Examples include constraints defining what is physically possible to be performed as an action (for instance, a human character not being able to fly, jump excessively high, or move excessively quickly) and constraints defining desired qualities of an action (such as an action duration, timing information, and/or physical contact information).

In some examples, a generative action process may be applied to a fighting game. An input action may be a sword attack performed by an avatar, with the generative process being used to generate variations upon this. Any number of characteristics may be considered appropriate for constraining the generation of variations upon this input action, with the generative process being operable to generate variations within these constraints. Exemplary constraints to be applied include an action duration and a contact location; the former ensures that the action takes the same amount of time despite the variation, while the latter ensures that the same interaction is had with external elements. In other words, these constraints are implemented in order to ensure that there is uniformity amongst variations where desirable to offer comparable or even identical functionality.

In this example, variations can therefore be generated in which the avatar's body movement is different whilst maintaining both the duration of the action and the location (relative to the avatar) at which the sword attack is considered to hit. These variations may relate to footwork, head orientation, and/or arm position (of the arm that does not hold the weapon), for example, and may be extended to the arm which does hold the weapon. In this latter case, this can lead to the weapon taking a different path between the same initial and final locations—for instance, with a thrust instead of a swing, or having a wider or narrower swing of the weapon. The modified motion may also include a change in the speed associated with the motion so as to achieve the defined action duration.

Figure 5:
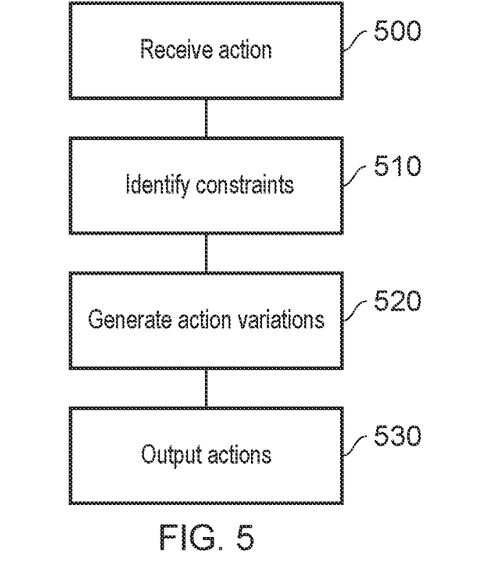
FIG. 5 schematically illustrates a generative method for generating actions.

FIG. 5 schematically illustrates a generative method for implementing one or more embodiments of the generative approach. While the method shows that constraints for the action generation process are defined after the input action is received, this is not an essential feature; the constraints may be defined before the action has been input, or may be supplied alongside the action.

A step 500 comprises receiving an input action and performing a characterisation process to identify one or more properties of the action. The input action may be received in any suitable format; in some embodiments an animation may be provided (such as a moving wireframe model or a video demonstrating an action), while in others a more parametrised format may be preferred. A format is considered suitable in the case that enough information is provided to enable an action to be identified and/or reproduced. In some embodiments it may be considered advantageous to instead provide two or more input actions; this can enable an improved determination of constraints to be applied to the action generation through the identification of common parameters between the input actions, for example.

This input may be provided manually (such as by a developer during a content creation process), or may be provided automatically without direct user intervention—or indeed in any other suitable fashion. For instance, the input action may be provided during the initialisation of a game (in some cases, as a part of a character creation process) so as to generate character-specific variations. Alternatively, or in addition, the input action may be provided in response to a predetermined condition being satisfied—for instance, during gameplay variations may be generated in response to a user equipping a new item (such as a weapon or armour)

that leads to a change in their actions (due to different attack styles or being more weighed down, for example).

Properties of the action that may be identified may include any parameters that relate to one or more aspects of the action. For instance, properties may include an action duration, one or more contact points (with the ground or other elements), an action type (such as 'motion' or 'attack', for example), and/or an action style (such as 'relaxed' or 'hurried'). In some embodiments, character-specific properties may be identified such as a character's handedness or personality. These can be identified based upon information associated with the input action (such as through an associated file or metadata), or may be able to be derived from the input action itself through image analysis or other processing.

A step 510 comprises identifying one or more constraints relating to the input action. These may be specified manually (such as by a developer during a content creation process or a user during gameplay), or may be derived from the input action itself. For instance, an action may be identified as belonging to a particular class or type that is associated with particular constraints—an example of this is a determination that the action corresponds to a 'motion' and that as a result the action time and contact points being made constant should be specified as constraints. Of course, the correlation between class and constraints may be selected as appropriate for a given embodiment. In some embodiments, constraints are identified directly from the properties or characteristics identified in step 500 rather than requiring explicit input or derivation in this step. Constraints should be identified so as to identify the core aspects of the action that define its function—in other words, any action that satisfies the same constraints should be substantially functionally equivalent.

In some embodiments, constraints may be defined in dependence upon physical characteristics of the avatar to which the action corresponds and/or characteristics of the environment in which the action is to be performed. Factors such as avatar biomechanics (such as how limbs should move relative to each other to be physically accurate) and physical quantities (such as a gradient in the environment or the strength of gravity) may be considered as constraints to be applied to an action generation process in order to ensure realistic actions are generated.

A step 520 comprises generating one or more variations of the input action in dependence upon the input action and the identified constraints. This step may be performed by a machine learning model that is trained to generate new actions based upon these inputs. The output of this step may comprise one or more actions that perform the same (or at least very similar) function as the input action, but have an alternative appearance in some manner. For instance, walking with a smaller step size but increased step speed may be considered to be functionally equivalent to another walking action if they cover the same distance in the same time. In embodiments of the invention, the functional equivalence can be determined by an observation of whether the constraints have been met by a generated action—alternatively, or in addition, one or more testing processes (such as playtesting or a comparison tool) may be used to determine the functional equivalence of the input and generated actions.

The machine learning model may be implemented in any suitable manner; for instance, a generative adversarial network (GAN) may be considered suitable. In such embodiments, the generative model may be trained to generate new actions based upon an input action and identified constraints while the discriminative network is trained to identify actions that do not represent a valid variation. Valid is a condition that may be determined freely; this may relate to how well the generated action corresponds to particular constraints or how realistic the action appears, for instance. The generative model and/or the discriminative model may be trained based upon real-world or pre-generated examples of variations of an action, for example. Other machine learning models may also be considered appropriate, rather than being limited to such an example—for example, a reinforcement learning approach may be adopted in which rewards are assigned based upon how realistic a generated action is and/or how well it conforms to the constraints.

In some embodiments, the action generation process may comprise a randomised component so as to increase the amount of variation between generated actions that is observed. For instance, one or more parameters (such as step length in a walking action) may be set to a random value with other parameters being adjusted to generate a valid action (that is, an action that satisfies the constraints). This randomised component may be flexible, rather than fixed, such that it can be modified where appropriate to simplify the action generation process. For example, the randomised value for step size could be modified to take the nearest value that would allow an integer number of steps to be completed within the action (so as to avoid an action being terminated in a potentially undesirable pose).

Similarly, a number of predetermined values for parameters may be defined that can be used to ensure that a variety of actions are generated. For instance, different tags may be defined for an action (relating to emotions, a physical state, and/or mental state of the avatar, for example) which each correspond to a predefined value or range of values that can be used as a part of the action generation process. This can assist with generating an appropriate action for a particular scenario, as well as increasing the variety. To provide an example, a walking action could have 'energetic' and 'tired' tags with the former having one or more associated predetermined values that correspond to an increased step length and the latter having one or more associated predetermined values that correspond to a decreased step length.

In some embodiments, an acceptable eccentricity may also be defined as an input to the action generation process. This is a measure of how much the generated action should be allowed to deviate from the input action—this may be determined on a per-application, per-action, per-character, and/or any other basis. The amount of deviation may be defined and/or measured in any suitable way—a frame-by-frame comparison of actions may be performed, for example, and a calculation performed to quantify how significantly the corresponding frames differ. Alternatively, or in addition, one or more characteristics may be defined or measured that can be used to compare actions—including an average or maximum movement speed, total height change, and/or amount of motion of each limb.

A step 530 comprises outputting one or more of the generated actions. In some embodiments this may comprise storing the actions for future use; alternatively, or in addition, this may comprise using one or more of the actions to animate an avatar in a virtual environment.

The above method therefore provides an example of a generative approach to action generation in accordance with one or more embodiments of the present disclosure. This approach can enable the generation of actions that are functionally and/or stylistically identical (or at least within a threshold similarity), enabling increased variety without significantly increasing a storage and content creation burden.

Figure 6:
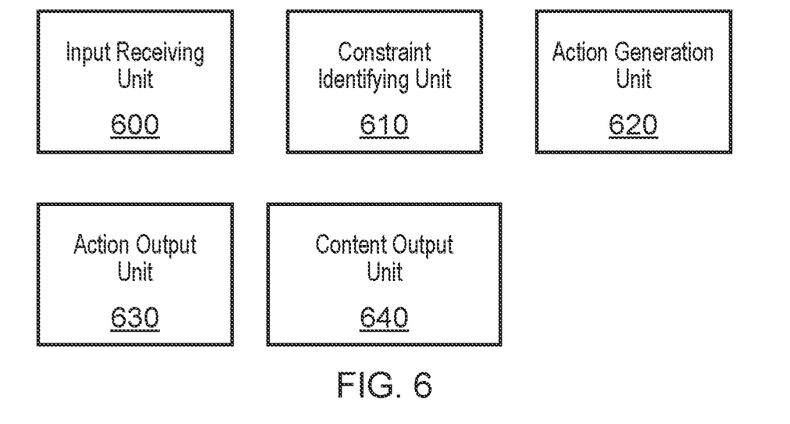
FIG. 6 schematically illustrates a content generation system operable to generate one or more actions to be performed by an agent.

FIG. 6 schematically illustrates a content generation system operable to generate one or more actions to be performed by an agent, the system comprising an input receiving unit 600, a constraint identifying unit 610, an action generation unit 620, and an optional action output unit 630 and/or content output unit 640.

The input receiving unit 600 is operable to receive information defining an input action, the input action being an action associated with the agent; in some embodiments, the input receiving unit 600 is instead operable to receive information defining a plurality of input actions that are functionally equivalent. This may be in the form of a single action or two or more instances of the same action (that is, two or more variations of the same action), for instance, in which the instances have the same functionality in that they achieve the same effect (such as the same motion, or the same interaction with an external element).

These actions may be received in any suitable format, with an appropriate conversion being applied as desired to generate a preferred input for a machine learning model where necessary. For instance, the received actions may be in the form of a video clip or animation which is able to be analysed using image processing techniques. Alternatively, or in addition, the received actions may be in a parameterised format describing the motion (such as a format in which movement of each limb is expressed numerically with respect to a centre of mass of the acting element), a wireframe representation of a motion, or any other format. In summary, the received information may comprise one or more of video content, animations, wire-frame models and motion information, and parametric information defining the input action.

The constraint identifying unit 610 is operable to identify one or more constraints associated with the input action. These one or more constraints are usually considered to relate to one or more functional and/or stylistic aspects of the input action; in other words, these constraints are conditions that can be applied to an action variation process in order to generate variations that have similar functional or stylistic characteristics—examples include characteristics such as interactions with external elements, duration, and agent handedness. For instance, one or more constraints may define contact points of the agent with one or more external elements or surfaces—these external elements or surfaces may include opponents (so that attacks are functionally similar) or the ground (so that walking or other actions can be functionally similar), for example.

In some embodiments, one or more constraints are defined in the received information—for example as a part of the action information or in associated metadata. Alternatively, or in addition, one or more constraints are derived in dependence upon the input action in a process that analyses the input action. For instance, the input action can be processed so as to determine which features are characteristic, and to determine constraints in dependence upon this characteristic. In some cases, the input action may be categorised as a particular type of action (such as 'walk', 'run', or 'attack') and a predetermined set of characteristics may be identified—constraints can then be determined in dependence upon these characteristics as appropriate for the input action.

In some embodiments, one or more constraints may be identified that define an acceptable eccentricity of the generated actions with respect to an input action. In other words, constraints may be determined that indicate how large a variation of a generated action may be with respect to the input action. This variation can be measured in any suitable way, for instance by comparing one or more parameters of a generated action to those of the input action. This eccentricity may be expressed as a numerical or descriptive factor that indicates an acceptable variation in a particular parameter, or may express a maximum value for one or more parameters, for example.

The action generation unit 620 is operable to generate, using a machine learning model, one or more actions in dependence upon the information defining the input action and the identified constraints wherein the one or more actions are variations of the defined (input) action. For example, the action generation unit 620 may be operable to provide the input action and one or more constraints to the machine learning model so as to generate additional actions. As noted above, these generated actions are to represent variations on the input actions such that they achieve substantially the same function in a different manner to that of the input action.

The action output unit 630 is operable to output one or more of the generated actions to a storage unit and/or a computer game. For instance, the generated actions may be saved locally and/or used to render content as appropriate.

The content output unit 640 is operable to execute gameplay of game in dependence upon user inputs, the gameplay comprising the agent performing one or more of the generated actions. In other words, during the execution of gameplay one or more instances of the input action may be replaced with corresponding generated actions. For example, in a fight sequence the same attack (represented by an input action) may be replaced on one or more occasions by corresponding generated actions. This may be performed with any suitable frequency or with any suitable regular or irregular pattern—each input action may be replaced, or only one in every two, three, five, or ten instances for example.

The arrangement of FIG. 6 is an example of a processor (for example, a GPU and/or CPU located in a games console or any other computing device) that is operable to generate one or more actions to be performed by an agent, and in particular is operable to:

receive information defining an input action, the input action being an action associated with the agent;

identify one or more constraints associated with the input action; and generate, using a machine learning model, one or more actions in dependence upon the information defining the input action and the identified constraints wherein the one or more actions are variations of the defined action.

Figure 7:
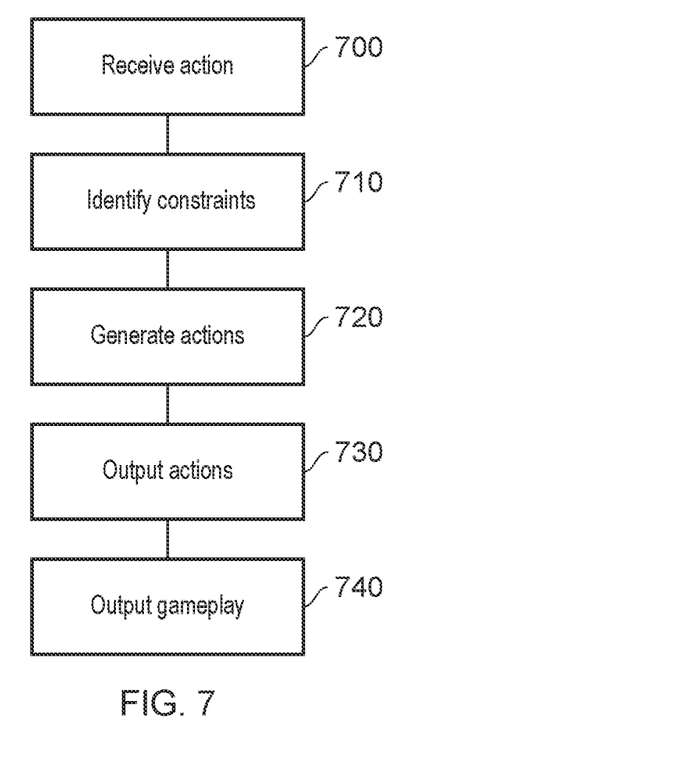
FIG. 7 schematically illustrates a content generation method for generating one or more actions to be performed by an agent.

FIG. 7 schematically illustrates a content generation method for generating one or more actions to be performed by an agent in accordance with one or more embodiments of the present disclosure.

A step 700 comprises receiving information defining an input action, the input action being an action associated with the agent.

A step 710 comprises identifying one or more constraints associated with the input action.

A step 720 comprises generating, using a machine learning model, one or more actions in dependence upon the information defining the input action and the identified constraints wherein the one or more actions are variations of the defined action.

An optional step 730 comprises outputting one or more of the generated actions to a storage unit and/or a computer game.

An optional step 740 comprises executing gameplay of game in dependence upon user inputs, the gameplay comprising the agent performing one or more of the generated actions.

In some embodiments, it is considered that the interpolative and generative approaches may be used in combination in order to generate new actions. In other words, the output of a method according to one of these approaches may be used as an input to a method according to the other of the approaches.

For instance, one or more of the input actions in the generative approach may be derived using the interpolative approach. This may be advantageous in that new actions can be generated (such as a running jump, as discussed in examples above) and then variations on those new actions can be generated. This can therefore enable the generation of a comprehensive set of actions from a smaller number of input actions, with each of those comprehensive set of actions having a number of variations available by virtue of the generative approach. This can therefore enable a content creator to design and distribute a small set of actions that can be expanded (such as at a client device) and to still achieve a wider range of actions and corresponding variations on those actions.

Similarly, one or more of the input actions in the interpolative approach may be derived using the generative approach. This may be advantageous in that the number of input actions for generating the latent space may be increased, and that the quality of the output (interpolated) actions may be increased. This is because the number of data points (input actions) is increased; for instance, rather than a single example of a 'walk' action the generative approach could be used to generate additional examples that can be input. This may have an impact on the ability of the machine learning model to derive characteristics of each action, thereby improving the interpolation.

In other words, the outputs of the method of FIG. 4 may be considered suitable for use as inputs to the method of FIG. 7. The outputs of the method of FIG. 7 may also be considered suitable for use as inputs to the method of FIG. 4. In some embodiments, an iterative approach may be taken in which each of the methods are performed repeatedly using outputs of the other method—this may increase the quality of the generated actions (quality being measured through the realism of the actions, for example, or how well they meet functional/stylistic constraints). For example, the method of FIG. 4 could be implemented to generate inputs for the method of FIG. 7, which then generates inputs for the method of FIG. 4. This iterative approach may be performed in any order, and with any number of iterations as appropriate. In some examples, the number of iterations may be determined based upon a predetermined threshold or a comparison of the differences in the output of each method throughout different iterations (such that if increasing iterations are not resulting in sufficiently different output actions, the iterative process may be terminated).

While the above discussion has focused on the motion aspect of the generation of actions, it is also considered that the action generation processes described above may be capable of generating audio or otherwise outputting information that can constrain the generation of audio for the generated actions. In some examples, appropriate audio may be derived from the input action or actions—given that the generated actions are functionally equivalent to or interpolated from input actions it is considered that many, if not all, of the corresponding sounds would be present in the input action should the input action be provided in a format that contains audio.

Alternatively, or in addition, the generated actions may be subject to processing so as to identify appropriate audio. For instance, this audio may comprise the determination of contact points with external surfaces/elements and identify appropriate audio for such a contact. This audio may be identified using a game engine or the like. Similarly, the action generation may include the definition of information to assist in an audio generation process. Examples of suitable information include identifying contact points within the action, for example, and/or one or more parameters indicating the strength of an action/contact or the like.

While in many cases the increase in variation between different actions is considered to be advantageous or preferable, in practice some users may find this to be distracting in some scenarios. For instance, some games may rely on a player accurately reading an opponents actions so as to be able to block their action—increasing the variation in actions may make it more challenging to read those actions, and therefore lead to a reduction in their success rate. It is therefore considered that in some cases it is possible for the user to toggle the action variation—in such cases, the input action is used rather than any of the corresponding generated actions. Of course, in some embodiments the variation may be provided on a sliding scale rather than in a binary fashion; in these embodiments, the rate at which variations are used in place of the input action may be varied freely as appropriate in a given scenario (for example, based upon user preference or a game situation).

In some embodiments, player performance may be monitored and a toggling or scaling of the use of action variations may be performed automatically. For example, if a user's win rate falls (or they are achieving a bad score, or other statistics indicate poor performance) then a toggling or scaling can be implemented without direct user intervention. In some embodiments, performance relative to the use of action variations may be monitored so as to identify the optimal rate of action variation for a user (that is, the rate of variation which correlates to the best user performance). This rate may be determined on a per-session, per-game, or per-genre basis, for example. Of course, a similar approach may be taken when a user experiences increasing success—as this can represent an unfair advantage against other players, either directly or in terms of an achieved score or the like, or that a user is not experiencing a game with a level of difficulty that was intended by the creator of that game.

The use of action variations may also be determined in dependence upon one or more environmental factors or a gameplay state. This may include both a rate at which variations of input actions are used, as well as modifying the generation of those actions or selection of those actions for use. For instance, if it is determined that there is danger within a virtual environment in which an avatar is present (for example through metadata, game state data, or analysis of music or a colour palette used) then variations which correspond to a greater urgency of action (such as movement with a higher intensity and/or fewer flourishes or the like) may be preferentially selected.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A content generation system operable to generate one or more actions to be performed by an agent, the system comprising:
    an input receiving unit operable to receive two or more actions for the agent;
    a model generation unit operable to input the actions to a machine learning model so as to generate a trained machine learning model; and
    an action generation unit operable to generate an action to be performed by the agent, wherein the generation comprises the selection of a latent space interpolation state associated with the trained machine learning model.
2. A system according to clause 1, wherein the input actions comprise one or more of animated models, wire frames, descriptions of motion, parameters, and/or video clips identifying actions.
3. A system according to any preceding clause, wherein the two or more actions comprise actions that represent variations on a single action.
4. A system according to any preceding clause, wherein the two or more actions comprise actions that represent distinct actions.
5. A system according to any preceding clause, wherein the machine learning model is a convolutional neural network.
6. A system according to any preceding clause, wherein the action to be generated is determined in accordance with one or more criteria.
7. A system according to clause 6, wherein the criteria comprise one or more of a duration, speed, or effect of the action.
8. A system according to any preceding clause, wherein the selection of a latent space interpolation state is performed in dependence upon one or more constraints upon a desired action to be generated.
9. A system according to any preceding clause, comprising an action modification unit operable to apply one or more modifications to the information defining the action to be performed.
10. A system according to any preceding clause, wherein the model generation unit is operable to characterise the actions to determine one or more parameters of the actions.
11. A system according to any preceding clause comprising an action implementation unit operable to animate a virtual element corresponding to the agent in accordance with the generated action.
12. A system according to any of clauses 1 to 10 comprising an action implementation unit operable to control a physical element corresponding to the agent in accordance with the generated action.
13. A method for generating one or more actions to be performed by an agent, the method comprising:
    receiving two or more actions for the agent;
    inputting the actions to a machine learning model so as to generate a trained machine learning model; and
    generating an action to be performed by the agent, wherein the generation comprises the selection of a latent space interpolation state associated with the trained machine learning model.
14. Computer software which, when executed by a computer, causes the computer to carry out the method of clause 13.
15. A non-transitory machine-readable storage medium which stores computer software according to clause 14.

The invention claimed is:

1. A content generation system operable to generate one or more actions to be performed by an agent, the system comprising:
    an input receiving unit operable to receive two or more actions for the agent;
    a model generation unit operable to input the actions to a machine learning model so as to generate a trained machine learning model; and
    an action generation unit operable to generate an action to be performed by the agent, wherein the generation comprises selection of a latent space interpolation state associated with the trained machine learning model,
    wherein the selection of a latent space interpolation state is performed in dependence upon one or more constraints upon a desired action to be generated.
2. The system of claim 1, wherein the input actions comprise one or more of animated models, wire frames, descriptions of motion, parameters, and/or video clips identifying actions.
3. The system of any claim 1, wherein the two or more actions comprise actions that represent variations on a single action.
4. The system of claim 1, wherein the two or more actions comprise actions that represent distinct actions.
5. The system of claim 1, wherein the machine learning model is a convolutional neural network.
6. The system of claim 1, wherein the action to be generated is determined in accordance with one or more criteria.
7. The system of claim 6, wherein the criteria comprise one or more of a duration, speed, or effect of the action.
8. The system of claim 1, comprising an action modification unit operable to apply one or more modifications to the information defining the action to be performed.
9. The system of claim 1, wherein the model generation unit is operable to characterise the actions to determine one or more parameters of the actions.
10. The system of claim 1, comprising an action implementation unit operable to animate a virtual element corresponding to the agent in accordance with the generated action.
11. The system of claim 1, comprising an action implementation unit operable to control a physical element corresponding to the agent in accordance with the generated action.
12. A method for generating one or more actions to be performed by an agent, the method comprising:
    receiving two or more actions for the agent;

inputting the actions to a machine learning model so as to generate a trained machine learning model; and generating an action to be performed by the agent, wherein the generation comprises selection of a latent space interpolation state associated with the trained machine learning model, wherein the selection of a latent space interpolation state is performed in dependence upon one or more constraints upon a desired action to be generated.

13. A non-transitory machine-readable storage medium which stores computer software which, when executed by a computer, causes the computer to perform a method for generating one or more actions to be performed by an agent, the method comprising:

receiving two or more actions for the agent;

inputting the actions to a machine learning model so as to generate a trained machine learning model; and generating an action to be performed by the agent, wherein the generation comprises selection of a latent space interpolation state associated with the trained machine learning model, wherein the selection of a latent space interpolation state is performed in dependence upon one or more constraints upon a desired action to be generated.

* * * * *